United States Patent
Maeda

(10) Patent No.: US 11,479,909 B2
(45) Date of Patent: *Oct. 25, 2022

(54) SYNTHETIC LEATHER

(71) Applicant: DIC Corporation, Tokyo (JP)

(72) Inventor: Ryo Maeda, Takaishi (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/734,636

(22) PCT Filed: May 9, 2019

(86) PCT No.: PCT/JP2019/018504
§ 371 (c)(1),
(2) Date: Dec. 3, 2020

(87) PCT Pub. No.: WO2019/235123
PCT Pub. Date: Dec. 12, 2019

(65) Prior Publication Data
US 2021/0156083 A1 May 27, 2021

(30) Foreign Application Priority Data

Jun. 7, 2018 (JP) .............................. JP2018-109461

(51) Int. Cl.
| D06N 3/14 | (2006.01) |
| C08G 18/08 | (2006.01) |
| C08G 18/28 | (2006.01) |
| C08G 18/30 | (2006.01) |
| D06N 3/08 | (2006.01) |
| D06N 3/12 | (2006.01) |

(52) U.S. Cl.
CPC ............ D06N 3/145 (2013.01); C08G 18/08 (2013.01); C08G 18/289 (2013.01); C08G 18/302 (2013.01); D06N 3/08 (2013.01); D06N 3/128 (2013.01); D06N 2203/068 (2013.01); D06N 2211/28 (2013.01)

(58) Field of Classification Search
None
See application file for complete search history.

(56) References Cited

U.S. PATENT DOCUMENTS

2018/0142409 A1    5/2018  Maeda
2021/0230798 A1*   7/2021  Maeda .................... C08G 18/65

FOREIGN PATENT DOCUMENTS

| EP | 1382622 A1 | 1/2004 |
| JP | 2003-335836 A | 11/2003 |
| JP | 2007-119749 A | 5/2007 |
| WO | 2017/179291 A1 | 10/2017 |

OTHER PUBLICATIONS

International Search Report dated Jul. 23, 2019, issued for PCT/JP2019/018504.
Supplementary European Search Report dated Jun. 24, 2021, issued for European Patent Application No. 19814303.4.

* cited by examiner

*Primary Examiner* — Arti Singh-Pandey
(74) *Attorney, Agent, or Firm* — Locke Lord LLP; James E. Armstrong, IV; Nicholas J. DiCeglie, Jr.

(57) ABSTRACT

The present invention provides a synthetic leather including at least a base material (i), an adhesive layer (ii), and a skin layer (iii), wherein the adhesive layer (ii) is formed of an anionic urethane resin composition containing an anionic urethane resin (S) having an anionic group concentration of 0.25 mmol/g or less, water (T), and an anionic surfactant (U), and the skin layer (iii) is formed of a urethane resin composition containing a urethane resin (A), for which a raw material is reactive silicone (a1) having a functional group that reacts with an isocyanate group, and containing water (B). Preferably, the urethane resin (A) is an anionic urethane resin having an acid value of 20 mgKOH/g or less.

8 Claims, No Drawings

SYNTHETIC LEATHER

CROSS REFERENCE TO RELATED APPLICATIONS

This application is related to four co-pending applications: "SYNTHETIC LEATHER" filed even date herewith in the name of Ryo Maeda as a national phase entry of PCT/JP2019/018502; "SYNTHETIC LEATHER" filed even date herewith in the name of Ryo Maeda as a national phase entry of PCT/JP2019/018503; "SYNTHETIC LEATHER" filed even date herewith in the name of Ryo Maeda as a national phase entry of PCT/JP2019/018505; and "SYNTHETIC LEATHER" filed even date herewith in the names of Ryo Maeda and Tomohiro Tetsui as a national phase entry of PCT/JP2019/018506; which applications are assigned to the assignee of the present application and all four incorporated by reference herein.

TECHNICAL FIELD

The present invention relates to a synthetic leather.

BACKGROUND ART

Polyurethane resins have been widely used for producing synthetic leathers (including artificial leathers) because of the mechanical strength and favorable texture thereof. Regarding this application, solvent-based urethane resins containing N,N-dimethylformamide (DMF) have been the mainstream until now. However, against the background of DMF control in Europe, tightening of VOC emission control in China and Taiwan, DMF control in the major apparel makers, and the like, a departure from DMF is required for the urethane resin used for each layer constituting a synthetic leather.

To address such circumstances, urethane resin compositions in which a urethane resin is, for example, dispersed in water have been widely researched (refer to, for example, PTL 1). Regarding skin layers of synthetic leathers, replacement of a solvent base with a water base, as in the invention described in PTL 1, is gradually increasing in the market. However, regarding a urethane resin for an adhesive layer, the shift to the water base has not yet advanced. In addition, regarding skin layers, there are many problems to be addressed, for example, an odor problem due to a neutralizer, a reduction in bleeding materials, further improvement in abrasion resistance, and the like, in accordance with the actual circumstances.

CITATION LIST

Patent Literature

PTL 1: Japanese Unexamined Patent Application Publication No. 2007-119749

SUMMARY OF INVENTION

Technical Problem

An issue to be addressed by the present invention is the provision of a synthetic leather having a reduced odor and having excellent abrasion resistance and bleeding resistance.

Solution to Problem

The present invention provides a synthetic leather including at least a base material (i), an adhesive layer (ii), and a skin layer (iii), wherein the adhesive layer (ii) is formed of an anionic urethane resin composition containing an anionic urethane resin (S) having an anionic group concentration of 0.25 mmol/g or less, water (T), and an anionic surfactant (U), and the skin layer (iii) is formed of a urethane resin composition containing a urethane resin (A), for which a raw material is reactive silicone (a1) having a functional group that reacts with an isocyanate group, and containing water (B).

Advantageous Effects of Invention

A synthetic leather according to the present invention has a reduced odor and has excellent abrasion resistance and bleeding resistance.

Using respective urethane resins for the adhesive layer (ii) and the skin layer (iii) can provide a synthetic leather further having excellent hydrolysis resistance in addition to the above-described effects.

Therefore, the synthetic leather according to the present invention may be used for various applications and, in particular, may be used for applications, such as car interior materials, furniture, and sports shoes, which require high durability and in which replacement of a solvent base with a water base has been considered to be difficult.

DESCRIPTION OF EMBODIMENTS

A synthetic leather according to the present invention includes at least a base material (i), an adhesive layer (ii), and a skin layer (iii).

The adhesive layer (ii) has to be formed of a urethane resin composition containing an anionic urethane resin (S) having an anionic group concentration of 0.25 mmol/g or less, water (T), and an anionic surfactant (U). Setting the anionic group concentration of the urethane resin to be within such a range enables the amount of an amine compound which is widely used as a neutralizer to be reduced and enables an odor problem to be suppressed from occurring. In addition, using the anionic surfactant (U) enables water dispersion stability of the urethane resin to be improved even when anionic groups are reduced, and since the anionic groups readily form hydrogen bonds with anionic groups of the urethane resin, a bleeding material can be reduced in quantity.

The anionic group concentration of the anionic urethane resin (S) is preferably 0.005 mmol/g or more and more preferably 0.01 mmol/g or more, preferably 0.25 mmol/g or less and more preferably 0.2 mmol/g or less, and preferably within the range of 0.005 to 0.25 mmol/g and more preferably within the range of 0.01 to 0.2 mmol/g since odor can be still further reduced while the water dispersion stability is maintained. In this regard, the anionic group concentration of the anionic urethane resin (S) is a value obtained by dividing the number of moles of an anionic group derived from a raw material used for producing the urethane resin having an anionic group by the total mass of raw materials for constituting the anionic urethane resin (S).

Examples of the method for introducing the anionic group into the anionic urethane resin (S) include a method in which at least one compound selected from a group consisting of glycol compounds having a carboxy group and compounds having a sulfonyl group is used as a raw material.

Regarding the glycol compounds having a carboxy group, for example, 2,2-dimethylolpropionic acid, 2,2-dimethylolbutanoic acid, 2,2-dimethylolbutyric acid, 2,2-dimethylolpropionic acid, and 2,2-valeric acid may be used. These compounds may be used alone, or at least two types may be used in combination.

Regarding the compounds having a sulfonyl group, for example, 3,4-diaminobutanesulfonic acid, 3,6-diamino-2-toluenesulfonic acid, 2,6-diaminobenzenesulfonic acid, and N-(2-aminoethyl)-2-aminoethylsulfonic acid may be used. These compounds may be used alone, or at least two types may be used in combination.

Some or all of the carboxy groups and the sulfonyl groups may be neutralized to basic compounds in an aqueous urethane resin composition. Regarding the basic compounds, for example, organic amines such as ammonia, triethylamine, pyridine, and morpholine; alkanolamines such as monoethanolamine and diethylethanolamine; and metal basic compounds containing sodium, potassium, lithium, or calcium may be used.

Regarding the anionic urethane resin (S), specifically, a reaction product of the raw material used for producing the urethane resin having an anionic group, a polyisocyanate (s1), a polyol (s2), an elongation agent (s3), and the like may be used.

The amount of the raw material used for producing the urethane resin having an anionic group is preferably 0.05% by mass or more, more preferably 0.1% by mass or more, and further preferably 0.3% by mass or more, preferably 10% by mass or less, more preferably 7% by mass or less, and further preferably 4% by mass or less, and preferably within the range of 0.05% by mass to 10% by mass, more preferably within the range of 0.1% by mass to 7% by mass, and further preferably within the range of 0.3% by mass to 4% by mass in the polyol (s2) since even further excellent chemical resistance and hydrolysis resistance are obtained.

Regarding the polyisocyanate (s1), for example, aliphatic or alicyclic polyisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate; and aromatic polyisocyanates such as phenylene diisocyanate, tolylene diisocyanate, diphenylmethane diisocyanate, naphthalene diisocyanate, polymethylene polyphenyl polyisocyanate, and carbodiimidized diphenylmethane polyisocyanate may be used. These polyisocyanates may be used alone, or at least two types may be used in combination. Of these, it is more preferable that at least one polyisocyanate selected from a group consisting of isophorone diisocyanate, toluene diisocyanate, and hexamethylene diisocyanate be used since even further excellent adhesiveness is obtained.

Regarding the polyol (s2), for example, polyether polyols, polyester polyols, polycarbonate polyols, dimer diols, acrylic polyols, and polybutadiene polyols may be used. These polyols may be used alone, or at least two types may be used in combination. Of these, it is preferable that polycarbonate polyols and/or polyether polyols be used, and polycarbonate polyols and/or polypropylene polyols are more preferable since even further excellent chemical resistance and hydrolysis resistance are obtained.

Regarding the polycarbonate polyols, preferably, hexane diol and/or polycarbonate polyols, for which a raw material is ε-caprolactone, is used since even further excellent chemical resistance and hydrolysis resistance are obtained.

The number average molecular weight of the polyol (s2) is preferably within the range of 500 to 100,000 and more preferably within the range of 800 to 10,000 since even further excellent chemical resistance and mechanical strength are obtained. In this regard, the number average molecular weight of the polyol (s2) is a value measured by using a gel-permeation-column chromatography (GPC) method.

Regarding the elongation agent (s3), for example, chain elongation agents having a hydroxy group and chain elongation agents having an amino group, each having a molecular weight of 50 or more and 500 or less, may be used. These may be used alone, or at least two types may be used in combination.

Regarding the chain elongation agents having a hydroxy group, for example, aliphatic polyol compounds such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; aromatic polyol compounds such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water may be used. These chain elongation agents may be used alone, or at least two types may be used in combination.

Regarding the chain elongation agents having an amino group, for example, ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, triethylenetetramine, and adipic acid dihydrazide may be used. These chain elongation agents may be used alone, or at least two types may be used in combination.

Regarding the chain elongation agent (s3), preferably, a chain elongation agent having an amino group is used since even further excellent light resistance is obtained, and it is preferable that at least one chain elongation agent selected from a group consisting of ethylenediamine, isophorone diamine, and hydrazine be used.

The amount of the chain elongation agent (s3) used is preferably within the range of 0.01% by mass to 20% by mass and more preferably within the range of 0.05% by mass to 10% by mass in the total mass of the raw materials constituting the urethane resin (S) since the durability, the chemical resistance, and the light resistance of a coat can be further improved.

Examples of the method for manufacturing the urethane resin (S) include a method in which a urethane prepolymer having an isocyanate group is obtained by reacting the polyisocyanate (s1), the raw material used for producing the urethane resin having an anionic group, and the polyol (s2), the anionic group is neutralized, water (T) and the chain elongation agent (s3) are added, and thereafter a reaction is performed. Preferably, these reactions are performed at a temperature of 50° C. to 100° C. for 3 to 10 hours, for example.

The molar ratio [(isocyanate group)/(hydroxy group and amino group)] of the isocyanate group in the polyisocyanate (s1) to the total of the hydroxy group and the amino group in the raw material for producing the urethane resin having a hydrophilic group, the polyol (s2), and the chain elongation agent (s3) is preferably within the range of 0.8 to 1.2 and more preferably within the range of 0.9 to 1.1.

The molar ratio [NCO/OH] of the isocyanate group in the polyisocyanate group (s1) when the urethane prepolymer is produced to the hydroxy group in the raw material used for producing the urethane resin having an anionic group and the polyol (s2) is preferably 0.8 or more and more preferably 0.9 or more, preferably 1.5 or less and more preferably 1.3 or less, and preferably within the range of 0.8 to 1.5 and more preferably within the range of 0.9 to 1.3.

In addition, when the urethane resin (S) is produced, an organic solvent may be used. Regarding the organic solvent, for example, ketone compounds such as acetone and methyl ethyl ketone; ether compounds such as tetrahydrofuran and dioxane; acetic acid ester compounds such as ethyl acetate and butyl acetate; nitrile compounds such as acetonitrile; amide compounds such as dimethylformamide and N-methylpyrrolidone; and film-forming auxiliaries such as dipropylene glycol dimethyl ether, diethyl diglycol, and diethyl adipate may be used. These organic solvents may be used alone, or at least two types may be used in combination. Regarding the organic solvent, preferably, acetone and/or a film-forming auxiliary is used. In this regard, it is preferable that the organic solvent other than the film-forming auxiliary be removed by a distillation method or the like when a urethane resin composition is obtained.

The weight average molecular weight of the anionic urethane resin (S) is preferably 10,000 or more and more preferably 30,000 or more, preferably 400,000 or less and more preferably 200,000 or less, and preferably within the range of 10,000 to 400,000 and more preferably within the range of 30,000 to 200,000 since even further excellent adhesiveness is obtained. In this regard, the weight average molecular weight of the anionic urethane resin (X) is a value measured by using a gel-permeation-column chromatography (GPC) method.

Regarding the water (T), ion-exchanged water, distilled water, and the like may be used. The content of the water (T) is preferably within the range of 30% by mass to 90% by mass and more preferably within the range of 35% by mass to 80% by mass in the urethane resin composition from the viewpoint of operability, coating performance, and storage stability.

Regarding the anionic surfactant (U), for example, alkylsulfosuccinic acid salts, N-acylamino acid salts, lactic acid fatty acid ester salts, fatty acid salts, succinic acid monoglycerides, diacetyltartaric acid monoglycerides, stearic acid tartaric acid esters, stearic acid citric acid esters, citric acid monoglycerides, lecithin, lysolecithin, alkylsulfuric acid salts, polyoxyethylene alkyl ether sulfuric acid salts, acyl N-methyltaurine salts, sodium stearyl fumarate, monoglyceride phosphoric acid salts, and alkyl ether phosphoric acid ester salts may be used. These anionic surfactants may be used alone, or at least two types may be used in combination. Of these, it is preferable that alkylsulfosuccinic acid salts be used since even further excellent water dispersion stability and bleeding resistance are obtained.

Regarding the alkylsulfosuccinic acid salts, for example, compounds including a straight chain or branched alkyl group having 1 to 16 and preferably 2 to 14 carbon atoms may be used, and the number of alkyl groups is preferably within the range of 1 to 3. Of these, it is preferable that dioctylsulfosuccinic acid salts be used since even further excellent water dispersion stability and bleeding resistance are obtained.

Examples of the salts include sodium salts, potassium salts, lithium salts, calcium salts, and ammonium salts.

The amount of the anionic surfactant (U) used is preferably 0.01 parts by mass or more and more preferably 0.1 parts by mass or more, preferably 10 parts by mass or less and more preferably 3 parts by mass or less, and preferably within the range of 0.01 to 10 parts by mass and more preferably within the range of 0.1 to 3 parts by mass relative to 100 parts by mass of the anionic urethane resin (X) since even further excellent water dispersion stability and bleeding resistance are obtained.

The urethane resin composition may contain other additives, as the situation demands, in addition to the anionic urethane resin (S), the water (T), and the anionic surfactant (U).

Regarding the other additives, for example, emulsifiers, coagulants, urethanization catalysts, silane coupling agents, fillers, thixotropy-imparting agents, tackifiers, waxes, heat stabilizers, light resistance stabilizers, fluorescent brighteners, foaming agents, pigments, dyes, conductivity-imparting agents, antistatic agents, moisture permeability improvers, water-repellent agents, oil-repellent agents, hollow foams, flame retardants, water absorbents, moisture absorbents, deodorants, foam stabilizers, blocking inhibitors, hydrolysis inhibitors, and thickeners may be used. These additives may be used alone, or at least two types may be used in combination.

The skin layer (iii) has to be formed of a urethane resin composition containing a urethane resin (A), for which a raw material is reactive silicone (a1) having a functional group that reacts with an isocyanate group, and containing water (B). Using the reactive silicone (a1) enables silicone to be incorporated into the urethane resin (A) so as to provide excellent abrasion resistance.

Regarding the urethane resin (A), for example, urethane resins that can be dispersed in water (B) described later and that have a hydrophilic group such as an anionic group, a cationic group, or a nonionic group; and urethane resins forcedly dispersed in the water (B) by an emulsifier may be used. These urethane resins (A) may be used alone, or at least two types may be used in combination.

The method for obtaining the urethane resin having an anionic group is the same as the method for the anionic urethane resin (X).

Examples of the method for obtaining the urethane resin having a cationic group include a method in which at least one compound having an amino group is used as a raw material.

Regarding the compound having an amino group, compounds having a primary or secondary amino group, for example, triethylenetetramine and diethylenetriamine; compounds having a tertiary amine group, for example, N-alkyldialkanolamines such as N-methyldiethanolamine and N-ethyldiethanolamine and N-alkyldiaminoalkylamines such as N-methyldiaminoethylamine and N-ethyldiaminoethylamine; and the like may be used. These compounds may be used alone, or at least two types may be used in combination.

Examples of the method for obtaining the urethane resin having a nonionic group include a method in which at least one compound having an oxyethylene structure is used as a raw material.

Regarding the compound having an oxyethylene structure, for example, polyether polyols having an oxyethylene structure such as polyoxyethylene glycols, polyoxyethylene polyoxypropylene glycols, and polyoxyethylene polyoxytetramethylene glycols may be used. These compounds may be used alone, or at least two types may be used in combination.

Examples of emulsifiers usable for obtaining the urethane resin that is forcedly dispersed in the water (B) include nonionic emulsifiers such as polyoxyethylene nonylphenyl ethers, polyoxyethylene lauryl ethers, polyoxyethylene styrylphenyl ethers, polyoxyethylene sorbitol tetraoleates, and polyoxyethylene-polyoxypropylene copolymers;

anionic emulsifiers such as fatty acid salts, for example, sodium oleate, alkylsulfuric acid ester salts, alkylbenzenesulfonic acid salts, alkylsulfosuccinic acid salts, naphthalenesulfonic acid salts, polyoxyethylenealkylsulfuric acid salts, alkanesulfonate sodium salts, and alkyl diphenyl ether sulfonic acid sodium salts; and cationic emulsifiers such as alkylamine salts, alkyltrimethylammonium salts, and alkyldimethylbenzylammonium salts. These emulsifiers may be used alone, or at least two types may be used in combination.

Of the above-described urethane resins as the urethane resin (A), it is preferable that the urethane resins having a hydrophilic group be used from the viewpoint of production stability, and it is more preferable that the urethane resins having an anionic group be used since even further excellent abrasion resistance and hydrolysis resistance are obtained.

In the case in which the urethane resin having an anionic group (hereafter abbreviated as "anionic urethane resin") is used for the urethane resin (A), the acid value of the anionic urethane resin is preferably 20 mgKOH/g or less, preferably 3 mgKOH/g or more and more preferably 5 mgKOH/g or more, preferably 17 mgKOH/g or less, more preferably 14 mgKOH/g or less, and further preferably 13 mgKOH/g or less, and more preferably within the range of 3 to 17 mgKOH/g, further preferably within the range of 5 to 14 mgKOH/g, and particularly preferably within the range of 5 to 13 mgKOH/g since even further excellent hydrolysis resistance is obtained. The method for measuring the acid value of the anionic urethane resin will be described in the example described later.

The amount of each of the glycol compound having a carboxy group used and the compound having a sulfonyl group used is preferably 0.1% by mass or more, more preferably 0.3% by mass or more, and further preferably 0.5% by mass or more, preferably 5% by mass or less, more preferably 4% by mass or less, and further preferably 3.5% by mass or less, and preferably within the range of 0.1% by mass to 5% by mass, more preferably within the range of 0.3% by mass to 4% by mass, and further preferably within the range of 0.5% by mass to 3.5% by mass relative to the total mass of the raw materials for constituting the urethane resin (A) since even further excellent hydrolysis resistance is obtained.

Regarding the urethane resin (A), specifically, a reaction product of the reactive silicone (a1), a polyol (a2), a raw material used for producing the urethane resin having a hydrophilic group, and a polyisocyanate (a3) may be used.

Regarding the reactive silicone (a1), for example, one-end diol-type reactive silicones, one-end monool-type reactive silicones, one-end diamine-type reactive silicones, and one-end monoamine-type reactive silicones denoted by Formula (1) below, two-end diol-type reactive silicones, two-end diamine-type reactive silicones, two-end dimercapt-type reactive silicones, and two-end disilanol-type reactive silicones denoted by Formula (2) below, and side-chain monoamine-type reactive silicones denoted by Formula (3) below may be used. These reactive silicones may be used alone, or at least two types may be used in combination.

[Chem 1]

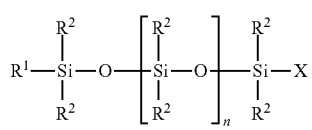
(1)

(In Formula (1), each of $R^1$ and $R^2$ represents an alkyl group having carbon atoms within the range of 1 to 10, X represents a structure denoted by any one of Formulae (X-1) to (X-12) below, and n represents an integer within the range of 50 to 670.)

[Chem 2]

(X-1)

(X-2)

(In Formulae (X-1) and (X-2), each of $R^1$ and $R^2$ represents an alkylene group having carbon atoms within the range of 1 to 10, and $R^3$ represents a hydrogen atom or an alkyl group having carbon atoms within the range of 1 to 8.)

[Chem 3]

(X-3)

(X-4)

(In Formulae (X-3) and (X-4), $R^1$ represents an alkylene group having carbon atoms within the range of 1 to 10, and $R^2$ represents a hydrogen atom or an alkyl group having carbon atoms within the range of 1 to 8.)

[Chem 4]

(X-5)

(X-6)

(In Formulae (X-5) and (X-6), R¹ represents an alkylene group having carbon atoms within the range of 1 to 10, and R² represents a hydrogen atom or an alkyl group having carbon atoms within the range of 1 to 8.)

[Chem 5]

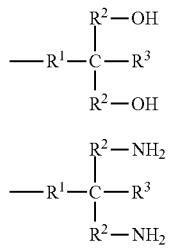

(In Formulae (X-7) and (X-8), each of R¹ and R² represents an alkylene group having carbon atoms within the range of 1 to 10, and R³ represents a hydrogen atom or an alkyl group having carbon atoms within the range of 1 to 8.)

[Chem 6]

—R¹—OR²—OH (X-9)

—R¹—O—R²—NH₂ (X-10)

(In Formulae (X-9) and (X-10), each of R¹ and R² represents an alkylene group having carbon atoms within the range of 1 to 10.)

[Chem 7]

—R¹—OH (X-11)

—R¹—NH₂ (X-12)

(In Formulae (X-11) and (X-12), R¹ represents an alkylene group having carbon atoms within the range of 1 to 10.)

[Chem 8]

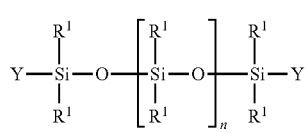

(In Formula (2), R¹ represents an alkyl group having carbon atoms within the range of 1 to 10, Y represents a structure denoted by any one of Formulae (Y-1) to (Y-5) below, and n represents an integer within the range of 50 to 670.)

[Chem 9]

—OH (Y-1)

[Chem 10]

—R¹—OH (Y-2)

—R¹—NH₂ (Y-3)

—R¹—SH (Y-4)

(In Formulae (Y-2) to (Y-4), R¹ represents an alkylene group having carbon atoms within the range of 1 to 10.)

[Chem 11]

—R¹—O—R²—OH (Y-5)

(In Formula (Y-5), each of R¹ and R² represents an alkylene group having carbon atoms within the range of 1 to 10.)

[Chem 12]

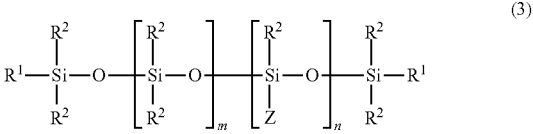

(In Formula (3), each of R¹ and R² represents an alkyl group having carbon atoms within the range of 1 to 8, Z represents a structure denoted by any one of Formulae (Z-1) and (Z-2) below, m represents an integer within the range of 50 to 670, and n represents an integer within the range of 1 to 10.)

[Chem 13]

—R¹—NH₂ (Z-1)

(In Formula (Z-1), R¹ represents an alkylene group having carbon atoms within the range of 1 to 10.)

[Chem. 14]

—R¹—$\overset{H}{N}$—R²—NH₂ (Z-2)

(In Formula (Z-2), each of R¹ and R² represents an alkylene group having carbon atoms within the range of 1 to 10.)

Regarding the reactive silicone (a1), since a silicone chain being introduced into a side chain of the urethane resin (A) provides still higher slipperiness and provides even further excellent abrasion resistance, preferably, the reactive silicone denoted by Formula (1) is used, more preferably, the reactive silicone denoted by Formula (1) in which X is at least one selected from a group consisting of Formulae (X-1), (X-7), and (X-9) is used, and further preferably, the reactive silicone in which X is denoted by Formula (X-1) and/or Formula (X-7) is used. In this regard, it is preferable that the reactive silicone which is denoted by Formula (1) and in which each of R¹ and R² represents an alkyl group having carbon atoms within the range of 1 to 3, n represents an integer within the range of 50 to 270, and in Formula (X-1) or Formula (X-7), each of R¹ and R² represents an alkylene group having carbon atoms within the range of 1 to 3 and R³ represents an alkyl group having carbon atoms within the range of 1 to 3 be used.

The number average molecular weight of the reactive silicone (a1) is preferably 1,000 or more, more preferably 2,000 or more, further preferably 4,000 or more, further preferably 4,500 or more, further preferably 4,700 or more, and particularly preferably 5,000 or more, preferably 100,000 or less, more preferably 80,000 or less, further preferably 70,000 or less, further preferably 50,000 or less, further preferably 30,000 or less, and particularly preferably 20,000 or less, preferably within the range of 1,000 to 100,000, more preferably within the range of 2,000 to 80,000, and further preferably within the range of 4,000 to 70,000, further preferably within the range of 4,500 to 50,000, further preferably within the range of 4,700 to 30,000, and particularly preferably within the range of 5,000 to 20,000 since the reactive silicone (a1) is incorporated into the urethane resin (A) so as to provide even further excellent abrasion resistance. In this regard, the number average molecular weight of the reactive silicone (a1) is a value measured by using a gel-permeation-column chromatography (GPC) method.

The amount of the reactive silicone (a1) used is preferably 1% by mass or more, more preferably 3% by mass or more, and further preferably 3.8% by mass or more, preferably 25% by mass or less, more preferably 20% by mass or less, and further preferably 19% by mass or less, and preferably within the range of 1% by mass to 25% by mass, more preferably within the range of 3% by mass to 20% by mass, and further preferably within the range of 3.8% by mass to 19% by mass relative to the total mass of the raw materials for constituting the urethane resin (A) since even further excellent abrasion resistance is obtained.

Regarding the preferable reactive silicone (a1), for example, "Silaplane FM-3321", "Silaplane FM-3325", "Silaplane FM-4421", "Silaplane FM-4425", "Silaplane FM-0421", "Silaplane FM-0425", "Silaplane FM-DA21", and "Silaplane FM-DA26" produced by JNC CORPORATION and "X-22-176GX-AJ" and "X-22-176F" produced by Shin-Etsu Chemical Co., Ltd., are commercially available.

Regarding the polyol (a2), for example, polyether polyols, polyester polyols, polyacryl polyols, polycarbonate polyols, and polybutadiene polyols may be used. These polyols may be used alone, or at least two types may be used in combination. Regarding the polyol (a2), preferably polyether polyols and/or polycarbonate polyols are used, and more preferably polytetramethylene glycols and/or polycarbonate polyols are used since even further excellent abrasion resistance and hydrolysis resistance are obtained. Regarding the polycarbonate polyols, for the same reason, polycarbonate polyols, for which raw materials are 1,6-hexanediol and/or 1,4-butanediol, are used, and more preferably polycarbonate polyols, for which raw materials are 1,6-hexanediol and 1,4-butanediol, are used. In this regard, in the case in which a urethane resin having an anionic group is used as the urethane resin (A), a compound other than the compounds having an oxyethylene structure is used as the polyol (a2).

The number average molecular weight of the polyol (a2) is preferably within the range of 500 to 8,000 and more preferably within the range of 800 to 5,000 from the viewpoint of mechanical strength of the resulting coat. In this regard, the number average molecular weight of the polyol (a2) is a value measured by using a gel-permeation-column chromatography (GPC) method.

The amount of the polyol (a2) used is preferably within the range of 40% by mass to 90% by mass, more preferably within the range of 45% by mass to 88% by mass, and further preferably within the range of 50% by mass to 85% by mass relative to the total mass of the raw materials for constituting the urethane resin (A) from the viewpoint of mechanical strength of the coat.

As the situation demands, a chain elongation agent (a2-1) having a molecular weight within the range of 50 to 450 may be used in combination with the polyol (a2).

Regarding the chain elongation agent (a2-1), for example, chain elongation agents having a hydroxy group such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, and trimethylolpropane; and chain elongation agents having an amino group such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexane diamine, and hydrazine may be used. These chain elongation agents may be used alone, or at least two types may be used in combination. Of these, preferably chain elongation agents having an amino group are used, and more preferably at least one chain elongation agent selected from a group consisting of ethylenediamine, isophoronediamine, and piperazine is used since even further excellent hydrolysis resistance and durability are obtained.

The amount of the chain elongation agent (a1-1) used is preferably within the range of 0.1% by mass to 10% by mass, more preferably within the range of 0.5% by mass to 7% by mass, and further preferably within the range of 0.8% by mass to 5% by mass relative to the total mass of the raw materials for constituting the urethane resin (A) since even further excellent hydrolysis resistance and durability are obtained.

Regarding the polyisocyanate (a3), for example, aromatic polyisocyanates such as phenylene diisocyanate, toluene diisocyanate, diphenylmethane diisocyanate, xylylene diisocyanate, naphthalene diisocyanate, polymethylene polyphenyl polyisocyanates, and carbodiimidized diphenylmethane polyisocyanates; and aliphatic polyisocyanates and/or alicyclic polyisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate may be used. These polyisocyanates may be used alone, or at least two types may be used in combination. Of these, preferably aliphatic polyisocyanates and/or alicyclic polyisocyanates are used, and more preferably at least one polyisocyanate selected from a group consisting of hexamethylene diisocyanate, isophorone diisocyanate, and dicyclohexylmethane diisocyanate is used from the viewpoint of light-discoloration resistance.

The amount of the polyisocyanate (a3) used is preferably within the range of 5% by mass to 40% by mass, more preferably within the range of 7% by mass to 30% by mass, and further preferably within the range of 10% by mass to 25% by mass relative to the total mass of the raw materials for constituting the urethane resin (A) from the viewpoint of production stability and mechanical properties of the resulting coat.

Examples of the method for manufacturing the urethane resin (A) include a method in which the polyol (a2), a raw material used for producing the urethane resin having a hydrophilic group, the reactive silicone (a1), the polyisocyanate (a3), and the chain elongation agent (a2-1), as the situation demands, are charged and reacted in a single operation. These reactions are performed at 50° C. to 100° C. for 3 to 10 hours, for example.

The molar ratio [(isocyanate groups)/(total of functional groups that react with isocyanate groups)] of isocyanate groups in the polyisocyanate (a3) to the total of hydroxy groups in the polyol (a2), hydroxy groups and amino groups in the chain elongation agent (a2-1), functional groups, which react with isocyanate groups, in the raw material for producing the urethane resin (A) having a hydrophilic group, and functional groups, which react with isocyanate groups, in the reactive silicone (a1) is preferably within the range of 0.8 to 1.2 and more preferably within the range of 0.9 to 1.1.

When the urethane resin (A) is produced, it is preferable that isocyanate groups remaining in the urethane resin (A) be deactivated. In the case in which the isocyanate groups are deactivated, it is preferable that an alcohol having one hydroxy group such as methanol be used. The amount of the alcohol used is preferably 0.001 to 10 parts by mass relative to 100 parts by mass of the urethane resin (A).

In this regard, when the urethane resin (A) is produced, an organic solvent may be used. Regarding the organic solvent, for example, ketone compounds such as acetone and methyl ethyl ketone; ether compounds such as tetrahydrofuran and dioxane; acetic acid ester compounds such as ethyl acetate and butyl acetate; nitrile compounds such as acetonitrile; and amide compounds such as dimethylformamide and n-methylpyrrolidone may be used. These organic solvents may be used alone, or at least two types may be used in combination. In this regard, preferably the organic solvent is removed by using a distillation method or the like when an aqueous urethane resin composition is obtained.

The weight average molecular weight of the urethane resin (A) is preferably 60,000 or more and more preferably 100,000 or more, preferably 700,000 or less and more preferably 500,000 or less, and preferably within the range of 60,000 to 700,000 and more preferably within the range of 100,000 to 500,000 since even further excellent hydrolysis resistance and abrasion resistance are obtained. In this regard, the weight average molecular weight of the urethane resin (A) is a value measured by using a gel-permeation-column chromatography (GPC) method.

Regarding the water (B), the same water as the water (T) may be used. The mass ratio [(A)/(B)] of the urethane resin (A) to the water (B) is preferably within the range of 10/80 to 70/30 and more preferably 20/80 to 60/40 from the viewpoint of operability.

The urethane resin composition contains the urethane resin (A) and the water (B) and may contain other additives, as the situation demands.

Regarding the other additives, for example, emulsifiers, neutralizers, thickeners, urethanization catalysts, cross-linking agents, foaming agents, pigments, dyes, oil-repellent agents, hollow foams, flame retardants, antifoaming agents, levelling agents, and blocking inhibitors may be used. These additives may be used alone, or at least two types may be used in combination.

Next, the synthetic leather according to the present invention will be described.

The synthetic leather according to the present invention contains at least a base material (i), an adhesive layer (ii), and a skin layer (iii), and specific examples include the following configurations.
(1) Base material (i), adhesive layer (ii), and skin layer (iii)
(2) Base material (i), adhesive layer (ii), intermediate layer, and skin layer (iii)
(3) Base material (i), porous layer, adhesive layer (ii), and skin layer (iii)
(4) Base material (i), porous layer, adhesive layer (ii), intermediate layer, and skin layer (iii)

Regarding the base material (i), for example, fiber base materials such as polyester fibers, polyethylene fibers, nylon fibers, acrylic fibers, polyurethane fibers, acetate fibers, rayon fibers, polylactic acid fibers, cotton, hemp, silk, wool, glass fibers, carbon fibers, unwoven fabrics of blended yarn or the like of these, woven fabrics, and knit fabrics; the nonwoven fabrics impregnated with a resin such as an polyurethane resin; the nonwoven fabrics further provided with a porous layer; and resin base materials such as thermoplastic urethane (TPU) may be used.

Regarding the porous layer, for example, porous layers formed of solvent-based urethane resin compositions by using a known wet-film-formation method; and aqueous urethane resin compositions made to be porous by using a known method may be used.

Regarding the material for forming the intermediate layer, for example, known aqueous urethane resins, solvent-based urethane resins, solventless urethane resins, aqueous acrylic resins, silicone resins, polypropylene resins, and polyester resins may be used. These resins may be used alone, or at least two types may be used in combination.

A surface-treatment layer may be further disposed on the skin layer (iii) to prevent flawing and the like. Regarding the material for forming the surface-treatment layer, for example, known aqueous urethane resins, solvent-based urethane resins, solventless urethane resins, aqueous acrylic resins, silicone resins, polypropylene resins, and polyester resins may be used. These resins may be used alone, or at least two types may be used in combination.

Next, a method for manufacturing a synthetic leather having the configuration in (1) above will be described.

Examples of the method for manufacturing the synthetic leather include a method in which a base material subjected to mold-release treatment is coated with a urethane resin composition for forming a skin layer, a drying step is performed so as to obtain the skin layer (iii), the resulting skin layer (iii) is coated with a urethane resin composition for forming an adhesive layer, drying is performed so as to form the adhesive layer (ii), and the resulting adhesive layer (ii) is bonded to the base material (i). Alternatively, a method in which the skin layer (iii) is coated with a urethane resin composition for forming an adhesive layer, bonding to the base material (i) is performed, and thereafter drying is performed so as to form the adhesive layer (ii) may be adopted.

Examples of the method for applying the urethane resin composition for forming the skin layer or forming the adhesive layer include a method in which an applicator, a roll coater, a spray coater, a T-die coater, a knife coater, a comma coater, or the like is used.

Examples of the method for drying the urethane resin composition include a method in which drying is performed at 40° C. to 130° C. for 1 to 10 minutes. The thickness of each of the resulting adhesive layer (ii) and skin layer (iii) is appropriately set in accordance with the use of the synthetic leather and is, for example, within the range of 0.5 to 100 μm.

After the synthetic leather is produced, as the situation demands, aging may be performed at 30° C. to 100° C. for 1 to 10 days, for example.

As described above, the synthetic leather according to the present invention has a reduced odor and has excellent abrasion resistance and bleeding resistance. A synthetic leather further having excellent hydrolysis resistance in addition to the above-described effects can be obtained by using a specific urethane resin for each of the adhesive layer (ii) and the skin layer (iii).

Therefore, the synthetic leather according to the present invention can be used for various applications and, in particular, can be used for applications, such as car interior materials, furniture, and sports shoes, which require high durability and in which replacement of a solvent base with a water base has been considered to be difficult.

EXAMPLES

The present invention will be described below in further detail with reference to examples.

[Synthesis Example 1] Preparation of Urethane Resin (S-1) Composition for Forming Adhesive Layer In a four-neck flask provided with an agitator, a reflux condenser tube, a thermometer, and a nitrogen blowing tube, under a nitrogen stream, 200 parts by mass of polypropylene glycol (number average molecular weight: 3,000), 6.4 parts by mass of 2,2-dimethylolpropionic acid (hereafter abbreviated as "DMPA"), and 12 parts by mass of dipropylene glycol dimethyl ether were homogeneously mixed at 70° C., 28 parts by mass of isophorone diisocyanate (hereafter abbreviated as "IPDI") was added, and a reaction was performed at 100° C. for 6 hours so as to obtain a urethane prepolymer solution having an isocyanate group (NCO/OH=1.1). Subsequently, 4.3 parts by mass of N,N-dimethylethanolamine was added to the urethane prepolymer solution so as to neutralize carboxy groups of the urethane prepolymer. Thereafter, 2 parts by mass of sodium dioctylsulfosuccinate was added and homogeneously mixed. After 441 parts by mass of ion-exchanged water was added, 0.6 parts by mass of 80%-by-mass hydrazine hydrate was added, and a reaction was performed so as to obtain a urethane resin (S-1) composition (nonvolatile content: 35% by mass; and anionic group concentration: 0.20 mmol/g) for forming an adhesive layer.

[Synthesis Example 2] Preparation of Urethane Resin (S-2) Composition for Forming Adhesive Layer In a four-neck flask provided with an agitator, a reflux condenser tube, a thermometer, and a nitrogen blowing tube, under a nitrogen stream, 200 parts by mass of polypropylene glycol (number average molecular weight: 2,000), 5.6 parts by mass of DMPA, and 12 parts by mass of dipropylene glycol dimethyl ether were homogeneously mixed at 70° C., 27 parts by mass of toluene diisocyanate (hereafter abbreviated as "TDI") was added, and a reaction was performed at 100° C. for 6 hours so as to obtain a urethane prepolymer solution having an isocyanate group (NCO/OH=1.1). Subsequently, 3.7 parts by mass of N,N-dimethylethanolamine was added to the urethane prepolymer solution so as to neutralize carboxy groups of the urethane prepolymer. Thereafter, 5 parts by mass of sodium dioctylsulfosuccinate was added and homogeneously mixed. After 442 parts by mass of ion-exchanged water was added, 0.7 parts by mass of 80%-by-mass hydrazine hydrate was added, and a reaction was performed so as to obtain a urethane resin (S-2) composition (nonvolatile content: 35% by mass and anionic group concentration: 0.18 mmol/g) for forming an adhesive layer.

[Synthesis Example 3] Preparation of Urethane Resin (S-3) Composition for Forming Adhesive Layer In a four-neck flask provided with an agitator, a reflux condenser tube, a thermometer, and a nitrogen blowing tube, under a nitrogen stream, 200 parts by mass of polypropylene glycol (number average molecular weight: 2,000), 4 parts by mass of DMPA, and 12 parts by mass of dipropylene glycol dimethyl ether were homogeneously mixed at 70° C., 23 parts by mass of TDI was added, and a reaction was performed at 100° C. for 6 hours so as to obtain a urethane prepolymer solution having an isocyanate group (NCO/OH=1.0). Subsequently, 3.5 parts by mass of N,N-dimethylethanolamine was added to the urethane prepolymer solution so as to neutralize carboxy groups of the urethane prepolymer. Thereafter, 5 parts by mass of sodium dioctylsulfosuccinate was added and homogeneously mixed. After 429 parts by mass of ion-exchanged water was added, 0.8 parts by mass of 80%-by-mass hydrazine hydrate was added, and a reaction was performed so as to obtain a urethane resin (S-3) composition (nonvolatile content: 35% by mass and anionic group concentration: 0.13 mmol/g) for forming an adhesive layer.

[Synthesis Example 4] Preparation of Urethane Resin (S-4) Composition for Forming Adhesive Layer In a four-neck flask provided with an agitator, a reflux condenser tube, a thermometer, and a nitrogen blowing tube, under a nitrogen stream, 200 parts by mass of polypropylene glycol (number average molecular weight: 2,000) and 6 parts by mass of DMPA were homogeneously mixed at 70° C., 35 parts by mass of IPDI was added, and a reaction was performed at 100° C. for 6 hours so as to obtain a urethane prepolymer solution having an isocyanate group (NCO/OH=1.1). Subsequently, the resulting urethane prepolymer was cooled to 60° C., and 103 parts by mass of acetone was added and homogeneously dissolved. After 4.5 parts by mass of triethylamine was added to the urethane prepolymer solution so as to neutralize carboxy groups of the urethane prepolymer, 2 parts by mass of sodium dioctylsulfosuccinate was added and homogeneously mixed. Subsequently, 454 parts by mass of ion-exchanged water was added, 0.7 parts by mass of 80%-by-mass hydrazine hydrate was added, and a reaction was performed. After the reaction was completed, acetone was removed by distillation under reduced pressure so as to obtain a urethane resin (S-4) composition (nonvolatile content: 35% by mass and anionic group concentration: 0.19 mmol/g) for forming an adhesive layer.

[Synthesis Example 5] Preparation of Urethane Resin (A-1) Composition for Forming Skin Layer In a four-neck flask provided with an agitator, a reflux condenser tube, a thermometer, and a nitrogen blowing tube, under a nitrogen stream, 500 parts by mass of polycarbonatediol ("DURANOL T5652" produced by Asahi Kasei Chemicals Corp., number average molecular weight: 2,000), 26 parts by mass of one-end diol-type reactive silicone ("X-22-176GX-A" produced by Shin-Etsu Chemical Co., Ltd., number average molecular weight: 14,000), 8 parts by mass of DMPA, and 269 parts by mass of methyl ethyl ketone were placed and homogeneously mixed. Thereafter, 86 parts by mass of IPDI was added, 0.1 parts by mass of dibutyltin dilaurate was added, and a reaction was performed at 70° C. for about 4 hours so as to obtain a methyl ethyl ketone solution of a urethane prepolymer having an isocyanate group. Subsequently, 6 parts by mass of triethylamine was added to the resulting methyl ethyl ketone solution of the urethane prepolymer so as to neutralize carboxy groups in the urethane prepolymer. Thereafter, 1,463 parts by mass of ion-exchanged water was added, 7 parts by mass of piperazine was added, and a reaction was performed. After the reaction was completed, methyl ethyl ketone was removed by distillation under reduced pressure so as to obtain a urethane resin (A-1) composition (nonvolatile content: 30% by mass and acid value: 5 KOHmg/g) for forming a skin layer.

[Synthesis Example 6] Preparation of Urethane Resin (A-2) Composition for Forming Skin Layer In a four-neck flask provided with an agitator, a reflux condenser tube, a thermometer, and a nitrogen blowing tube, under a nitrogen stream, 500 parts by mass of polycarbonatediol ("DURANOL T5652" produced by Asahi Kasei Chemicals Corp., number average molecular weight: 2,000), 133 parts by mass of polytetramethylene glycol (number average molecular weight: 1,000), 33 parts by mass of one-end diol-type reactive silicone ("X-22-176F" produced by Shin-Etsu Chemical Co., Ltd., number average molecular weight: 12,000), 17 parts by mass of DMPA, and 385 parts by mass of methyl ethyl ketone were placed and homogeneously mixed. Thereafter, 86 parts by mass of IPDI was added, 0.1 parts by mass of dibutyltin dilaurate was added, and a reaction was performed at 70° C. for about 4 hours so as to obtain a methyl ethyl ketone solution of a urethane prepolymer having an isocyanate group. Subsequently, 13 parts by mass of triethylamine was added to the resulting methyl ethyl ketone solution of the urethane prepolymer so as to neutralize carboxy groups in the urethane prepolymer. Thereafter, 2,098 parts by mass of ion-exchanged water was added, 15 parts by mass of ethylenediamine was added, and a reaction was performed. After the reaction was completed, methyl ethyl ketone was removed by distillation under reduced pressure so as to obtain a urethane resin (A-2) composition (nonvolatile content: 30% by mass and acid value: 8 KOHmg/g) for forming a skin layer.

[Synthesis Example 7] Preparation of Urethane Resin (A-3) Composition for Forming Skin Layer In a four-neck flask provided with an agitator, a reflux condenser tube, a thermometer, and a nitrogen blowing tube, under a nitrogen stream, 500 parts by mass of polytetramethylene glycol (number average molecular weight: 2,000), 167 parts by mass of one-end diol-type reactive silicone ("Silaplane FM-DA21" produced by JNC CORPORATION, number average molecular weight: 5,000), 23 parts by mass of DMPA, and 400 parts by mass of methyl ethyl ketone were placed and homogeneously mixed. Thereafter, 203 parts by mass of IPDI was added, 0.1 parts by mass of dibutyltin dilaurate was added, and a reaction was performed at 70° C. for about 4 hours so as to obtain a methyl ethyl ketone solution of a urethane prepolymer having an isocyanate group. Subsequently, 18 parts by mass of triethylamine was added to the resulting methyl ethyl ketone solution of the urethane prepolymer so as to neutralize carboxy groups in the urethane prepolymer. Thereafter, 2,176 parts by mass of ion-exchanged water was added, 39 parts by mass of piperazine was added, and a reaction was performed. After the reaction was completed, methyl ethyl ketone was removed by distillation under reduced pressure so as to obtain a urethane resin (A-3) composition (nonvolatile content: 30% by mass and acid value: 11 KOHmg/g) for forming a skin layer.

[Comparative Synthesis Example 1] Preparation of Urethane Resin (SR-1) Composition for Forming Adhesive Layer In a four-neck flask provided with an agitator, a reflux condenser tube, a thermometer, and a nitrogen blowing tube, under a nitrogen stream, 200 parts by mass of polypropylene glycol (number average molecular weight: 2,000) and 15 parts by mass of DMPA were homogeneously mixed at 70° C., 52 parts by mass of IPDI was added, and a reaction was performed at 100° C. for 6 hours so as to obtain a urethane prepolymer solution having an isocyanate group (NCO/OH=1.1). Subsequently, the resulting urethane prepolymer was cooled to 60° C., and 114 parts by mass of acetone was added and homogeneously dissolved. After 11.3 parts by mass of triethylamine was added to the urethane prepolymer solution so as to neutralize carboxy groups in the urethane prepolymer, 2 parts by mass of sodium dioctylsulfosuccinate was added and homogeneously mixed. Subsequently, 501 parts by mass of ion-exchanged water was added, 1.1 parts by mass of 80%-by-mass hydrazine hydrate was added, and a reaction was performed. After the reaction was completed, acetone was removed by distillation under reduced pressure so as to obtain a urethane resin (SR-1) composition (nonvolatile content: 35% by mass and anionic group concentration: 0.42 mmol/g) for forming an adhesive layer.

[Comparative Synthesis Example 2] Preparation of Urethane Resin (SR-2) Composition for Forming Adhesive Layer In a four-neck flask provided with an agitator, a reflux condenser tube, a thermometer, and a nitrogen blowing tube, under a nitrogen stream, 200 parts by mass of polypropylene glycol (number average molecular weight: 2,000) and 6 parts by mass of DMPA were homogeneously mixed at 70° C., 35 parts by mass of IPDI was added, and a reaction was performed at 100° C. for 6 hours so as to obtain a urethane prepolymer solution having an isocyanate group (NCO/OH=1.1). Subsequently, the resulting urethane prepolymer was cooled to 60° C., and 103 parts by mass of acetone was added and homogeneously dissolved. After 4.5 parts by mass of triethylamine was added to the urethane prepolymer solution so as to neutralize carboxy groups in the urethane prepolymer, 2 parts by mass of nonionic emulsifier ("ADEKA Pluronic F-68" produced by ADEKA Corporation, hereafter abbreviated as "nonionic") was added and homogeneously mixed. Subsequently, 454 parts by mass of ion-exchanged water was added, 0.7 parts by mass of 80%-by-mass hydrazine hydrate was added, and a reaction was performed. After the reaction was completed, acetone was removed by distillation under reduced pressure so as to obtain a urethane resin (SR-2) composition (nonvolatile content: 35% by mass and anionic group concentration: 0.19 mmol/g) for forming an adhesive layer.

[Example 1]<Production of Synthetic Leather>

A mixture liquid composed of 100 parts by mass of urethane resin (A-1) composition for forming a skin layer obtained in Synthesis example 4, 10 parts by mass of water-dispersible black pigment ("Dilac HS-9530" produced by DIC Corporation), and 1 part by mass of association-type thickener ("Hydran assister T10" produced by DIC Corporation) was applied to flat release paper ("DN-TP-155T" produced by Ajinomoto Co., Inc.) so that the film thickness after drying became 30 µm, drying was performed at 70° C. for 2 minutes, and drying was further performed at 120° C. for 2 minutes.

Subsequently, a mixture liquid composed of 100 parts by mass of urethane resin (S-1) composition for forming adhesive layer obtained in Synthesis example 1, 1 part by mass of association-type thickener ("Hydran assister T10" produced by DIC Corporation), and 9 parts by mass of polyisocyanate-based cross-linking agent ("Hydran assister C5" produced by DIC Corporation) was applied so that the film thickness after drying became 50 µm, and drying was performed at 70° C. for 3 minutes. Immediately after drying was performed, polyurethane-impregnated nonwoven fabric was bonded, heat treatment was performed at 120° C. for 2 minutes, and aging was performed at 50° C. for 2 days. Subsequently, the release paper was peeled so as to obtain a synthetic leather.

Examples 2 to 8 and Comparative Examples 1 to 5

Synthetic leathers were obtained in the same manner as in Example 1 except that the types of the respective urethane resin compositions for forming a skin layer used and the respective urethane resin compositions for forming an adhesive layer used were changed to those described in Tables 1 to 3.

[Method for Measuring Number Average Molecular Weight and Weight Average Molecular Weight]

Each of the number average molecular weight of the polyol used in the synthesis example, the number average molecular weight of the reactive silicone (a1), and the weight average molecular weight of the urethane resin obtained in the synthesis example was a value obtained by performing measurement under the following conditions by using a gel-permeation-column chromatography (GPC) method.

Measuring apparatus: high speed GPC apparatus ("HLC-8220 GPC" produced by Tosoh Corporation)
Column: the following columns produced by Tosoh Corporation were used while being connected in series.
"TSKgel G5000" (7.8 mm I.D.×30 cm)×1 unit
"TSKgel G4000" (7.8 mm I.D.×30 cm)×1 unit
"TSKgel G3000" (7.8 mm I.D.×30 cm)×1 unit
"TSKgel G2000" (7.8 mm I.D.×30 cm)×1 unit
Detector: RI (differential refractometer)
Column temperature: 40° C.
Eluant: tetrahydrofuran (THF)
Flow rate: 1.0 mL/min
Injection rate: 100 µL (tetrahydrofuran solution having a sample concentration of 0.4% by mass)
Standard sample: the calibration curve was formed by using the following standard polystyrenes
(Standard Polystyrene)
"TSKgel Standard polystyrene A-500" produced by Tosoh Corporation
"TSKgel Standard polystyrene A-1000" produced by Tosoh Corporation
"TSKgel Standard polystyrene A-2500" produced by Tosoh Corporation
"TSKgel Standard polystyrene A-5000" produced by Tosoh Corporation
"TSKgel Standard polystyrene F-1" produced by Tosoh Corporation
"TSKgel Standard polystyrene F-2" produced by Tosoh Corporation
"TSKgel Standard polystyrene F-4" produced by Tosoh Corporation
"TSKgel Standard polystyrene F-10" produced by Tosoh Corporation
"TSKgel Standard polystyrene F-20" produced by Tosoh Corporation
"TSKgel Standard polystyrene F-40" produced by Tosoh Corporation
"TSKgel Standard polystyrene F-80" produced by Tosoh Corporation
"TSKgel Standard polystyrene F-128" produced by Tosoh Corporation
"TSKgel Standard polystyrene F-288" produced by Tosoh Corporation
"TSKgel Standard polystyrene F-550" produced by Tosoh Corporation

[Method for measuring acid value of urethane resin (A)]

The urethane rein composition for forming a skin layer obtained in the synthesis example was dried, and 0.05 g to 0.5 g of the dried and solidified resin particles were weighed into a 300-mL Erlenmeyer flask. Subsequently, about 80 mL of solvent mixture in which a mass ratio [tetrahydrofuran/ion-exchanged water] of tetrahydrofuran to the ion-exchanged water was 80/20 was added so as to obtain a mixture liquid of them.

Thereafter, a phenolphthalein indicator was mixed into the resulting mixture liquid, titration with a 0.1-mol/L potassium hydroxide aqueous solution standardized in advance was performed, and the acid value (mgKOH/g) of the urethane resin (A) was determined from the amount of potassium hydroxide used for the titration on the basis of the calculation formula (1) below.

$$\text{Calculation formula } A=(B\times f\times 5.611)/S \qquad (1)$$

In the formula, A represents the acid value (mgKOH/g) of the solid content of the resin, B represents the amount (mL) of the 0.1-mol/L potassium hydroxide aqueous solution used for the titration, f represents the factor of the 0.1-mol/L potassium hydroxide aqueous solution, S represents the mass (g) of the resin particles, and 5.611 is the formula weight (56.11/10) of potassium hydroxide.

[Method for Evaluating Odor]

The synthetic leather obtained in each of the examples and the comparative examples was placed in a closed container and was left to stand for 24 hours under the condition of a temperature of 80° C. Thereafter, the lid was opened, and an odor was examined and rated as described below.
"A": there was no odor
"B": there was a slight odor
"C": there was a strong odor

[Method for Measuring Abrasion Resistance]

The synthetic leather obtained in each of the examples and the comparative examples was subjected to a flat surface abrasion test (JASO-M403-88B method, load: 1 kg, and stroke: 140 mm), and the number of times when a base cloth was exposed due to abrasion of the synthetic leather was measured and rated as described below.
"A": 30,000 times or more
"B": 10,000 times or more and less than 30,000 times
"C": less than 10,000 times

[Method for Evaluating Bleeding Resistance]

The synthetic leather obtained in each of the examples and the comparative examples was left to stand for five weeks under the conditions of a temperature of 70° C. and a humidity of 95%. Thereafter the appearance was observed and rated as described below.

"A": there was no irregularity in the appearance

"B": a small amount of bleeding material was formed on the surface

"C": a large amount of bleeding material was formed on the surface

[Method for Evaluating Hydrolysis Resistance]

The synthetic leather obtained in each of the examples and the comparative examples was left to stand for five weeks under the conditions of a temperature of 70° C. and a humidity of 95%. Thereafter appearance observation and finger touch were performed and rated as described below.

"A": there was no irregularity in the appearance and the finger touch

"B": the appearance was changed in glossiness, but no irregularity was found by finger touch "C": the appearance was changed in glossiness, and stickiness was recognized

TABLE 1

|  |  | Example 1 | Example 2 | Example 3 | Example 4 |
|---|---|---|---|---|---|
| Adhesive layer (ii) | Type of urethane resin composition for forming adhesive layer | (S-1) | (S-2) | (S-3) | (S-4) |
|  | Anionic group concentration of urethane resin (X) (mmol/g) | 0.2 | 0.18 | 0.13 | 0.19 |
|  | Anionic surfactant (Z) | SDS | SDS | SDS | SDS |
| Skin layer (iii) | Type of urethane resin composition for forming skin layer | (A-1) | (A-1) | (A-1) | (A-1) |
|  | Acid value of urethane resin (A) (mgKOH/g) | 5 | 5 | 5 | 5 |
|  | Number average molecular weight of reactive silicone (a1) | 14,000 | 14,000 | 14,000 | 14,000 |
| Evaluation of odor |  | A | A | A | A |
| Evaluation of abrasion resistance |  | A | A | A | A |
| Evaluation of bleeding resistance |  | A | A | A | A |
| Evaluation of hydrolysis resistance |  | A | A | A | A |

TABLE 2

|  |  | Example 5 | Example 6 | Example 7 | Example 8 |
|---|---|---|---|---|---|
| Adhesive layer (ii) | Type of urethane resin composition for forming adhesive layer | (S-1) | (S-2) | (S-3) | (S-4) |
|  | Anionic group concentration of urethane resin (X) (mmol/g) | 0.2 | 0.18 | 0.13 | 0.19 |
|  | Anionic surfactant (Z) | SDS | SDS | SDS | SDS |
| Skin layer (iii) | Type of urethane resin composition for forming skin layer | (A-2) | (A-2) | (A-3) | (A-3) |
|  | Acid value of urethane resin (A) (mgKOH/g) | 8 | 8 | 11 | 11 |
|  | Number average molecular weight of reactive silicone (a1) | 12,000 | 12,000 | 5,000 | 5,000 |
| Evaluation of odor |  | A | A | A | A |
| Evaluation of abrasion resistance |  | A | A | A | A |
| Evaluation of bleeding resistance |  | A | A | A | A |
| Evaluation of hydrolysis resistance |  | A | A | A | A |

TABLE 3

|  |  | Comparative example 1 | Comparative example 2 |
|---|---|---|---|
| Adhesive layer (ii) | Type of urethane resin composition for forming adhesive layer | (SR-1) | (SR-2) |
|  | Anionic group concentration of urethane resin (X) (mmol/g) | 0.42 | 0.19 |
|  | Surfactant | SDS | nonionic |
| Skin layer (iii) | Type of urethane resin composition for forming skin layer | (A-1) | (A-1) |
|  | Acid value of urethane resin (A) (mgKOH/g) | 5 | 5 |
|  | Number average molecular weight of reactive silicone (a1) | 14,000 | 14,000 |
| Evaluation of odor |  | C | A |
| Evaluation of abrasion resistance |  | A | A |
| Evaluation of bleeding resistance |  | A | C |
| Evaluation of hydrolysis resistance |  | B | A |

In this regard, "SDS" in Table 1 and 2 represents sodium dioctylsulfosuccinate.

According to Examples 1 to 8, the synthetic leather according to the present invention had a reduced odor and had excellent abrasion resistance, bleeding resistance, and hydrolysis resistance.

Meanwhile, in the aspect of Comparative example 1 in which the anionic urethane resin having an anionic group concentration beyond the range specified according to the present invention was used as the adhesive layer (ii), there was an odor.

In the aspect of Comparative example 2 in which the urethane resin composition containing a nonionic surfactant instead of the anionic surfactant (Z) was used for the adhesive layer (ii), the bleeding resistance was poor.

The invention claimed is:

1. A synthetic leather comprising at least a base material (i), an adhesive layer (ii), and a skin layer (iii),
    wherein the adhesive layer (ii) is formed of an anionic urethane resin composition containing an anionic urethane resin (S) having an anionic group concentration of 0.25 mmol/g or less, water (T), and an anionic surfactant (U),
    wherein the anionic urethane resin (S) is produced using a polyol (s2) as a raw material, wherein the polyol (s2) includes a polycarbonate polyol, a polypropylene polyol or both,
    and wherein the polycarbonate polyol includes a polycarbonate polyol produced using hexane diol, ε-caprolactone, or both, and
    the skin layer (iii) is formed of a urethane resin composition containing a urethane resin (A), for which a raw material is reactive silicone (a1) having a functional group that reacts with an isocyanate group, and containing water (B).

2. The synthetic leather according to claim 1, wherein the urethane resin (A) is an anionic urethane resin having an acid value of 20 mgKOH/g or less.

3. The synthetic leather according to claim 2, wherein a number average molecular weight of the reactive silicone (a1) is 4,000 or more.

4. The synthetic leather according to claim 3, wherein the anionic surfactant (U) is an alkylsulfosuccinate.

5. The synthetic leather according to claim 2, wherein the anionic surfactant (U) is an alkylsulfosuccinate.

6. The synthetic leather according to claim 1, wherein a number average molecular weight of the reactive silicone (a1) is 4,000 or more.

7. The synthetic leather according to claim 6, wherein the anionic surfactant (U) is an alkylsulfosuccinate.

8. The synthetic leather according to claim 1, wherein the anionic surfactant (U) is an alkylsulfosuccinate.

* * * * *